Oct. 29, 1957   L. MOLLENBERG   2,811,657
MEANS FOR SECURING A CAPACITOR IN A DYNAMOELECTRIC
MACHINE HOUSING
Filed Feb. 3, 1955
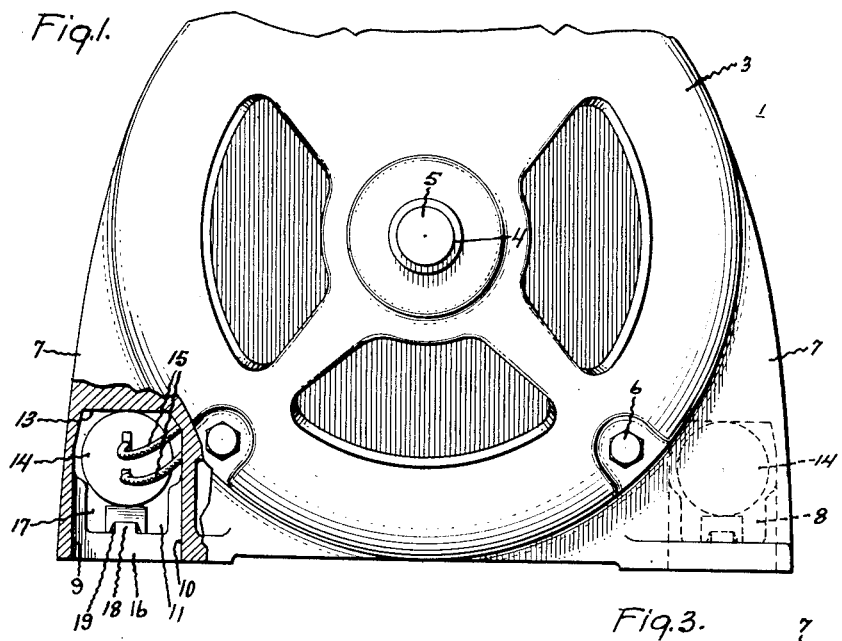
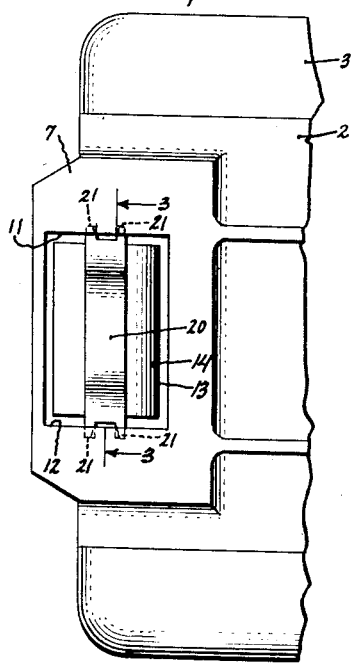
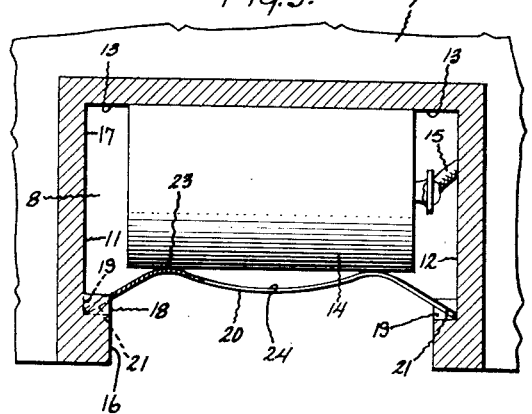
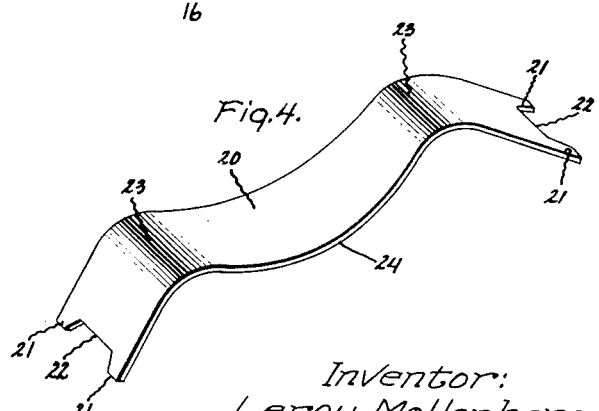
Inventor:
Leroy Mollenberg,
by *Robert S. Iru*
His Attorney.

United States Patent Office 2,811,657
Patented Oct. 29, 1957

2,811,657

MEANS FOR SECURING A CAPACITOR IN A DYNAMOELECTRIC MACHINE HOUSING

Leroy Mollenberg, Fort Wayne, Ind., assignor to General Electric Company, a corporation of New York Application February 3, 1955, Serial No. 485,881

2 Claims. (Cl. 310—72)

This invention relates to fastening means, and more particularly to an arrangement for securing a capacitor within a dynamoelectric machine.

There are many types of dynamoelectric machines which require that a capacitor be connected in their circuit. It is customary with such machines to secure the capacitor to the dynamoelectric machine, and this is frequently done by the simple expedient of placing the capacitor within a housing of its own and securing this assembly to the dynamoelectric machine. While this is a relatively simple solution, it has the disadvantage that an extra part, the capacitor housing member, is required, and that additional space is taken up by the assembly of the capacitor to the dynamoelectric machine because one is merely fastened to the outside of the other. More recently, in those dynamoelectric machines which were large enough to accommodate them, capacitors have been maintained within some part of the housing of the machine itself. While this has eliminated the requirement of the additional housing member and has saved space, it has raised an acute problem insofar as the means for securing the capacitor within the dynamoelectric machine is concerned. This results from the fact that the capacitor must be firmly secured within the machine so that undesirable vibration noise will not occur, yet it must also be removable quickly and easily. In addition, there is the prime requirement that it be simple to assemble and economical to manufacture.

It is, therefore, an object of this invention to provide an improved arrangement for securing a capacitor within a dynamoelectric machine housing.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention includes supporting means for a dynamoelectric machine which has internal walls forming a recess which is adapted to receive a capacitor. At least two indentations are formed in the walls on substantially opposite sides of the recess and a leaf spring member is arranged within the recess with at least a portion of each of its ends arranged within an indentation. By this means, the spring member is adapted to bear against a capacitor placed within the recess so as to secure the capacitor firmly therein.

In the drawing,

Figure 1 is an end view, partly broken away and partly in cross section, of a dynamoelectric machine incorporating the improved capacitor securing means;

Figure 2 is a fragmentary view of the machine from below;

Figure 3 is a view along line 3—3 in Figure 2; and

Figure 4 is a view of a preferred type of spring member to be used in the improved fastening arrangement.

Referring now to the figures of the drawing, there is shown a dynamoelectric machine, generally indicated at 1, having a central shell member 2 with an end shield 3 arranged at each end of the shell member 2 so as to enclose the machine. One of the end shields 3 may be provided with an opening 4 to accommodate a shaft 5 secured to rotate with the dynamoelectric machine. End shields 3 may be secured to the shell member 2 by any standard means such as, for instance, throughbolts 6.

A pair of support members 7 are formed integral with member 2. Each of these is relatively thick at its base and is formed with a recess 8 defined by side walls 9 and 10, end walls 11 and 12, and top wall 13. It will be seen that the recess is open at its under side so that a capacitor 14 may be inserted therein and connected to the motor through leads 15. Each of the end walls 11 and 12 is formed with a lower portion 16 and an upper portion 17 which is indented with respect to portion 16 (best seen in Figure 1). Lower portion 16 includes an upwardly extending part 18 which defines indentations 19 on each side thereof.

A leaf spring member 20 is provided, and each end of this member is formed with a pair of tangs 21 which define between them a recess 22. The spring member 20 is preferably formed as shown with a pair of raised portions 23 respectively located at the ends of a bowed portion 24. When the spring member 20 is in position, raised portions 23 will bear against the capacitor 14 to maintain it secured in position within the recess 8. This is achieved by arranging the spring member 20 within the recess 8 so that each of the tangs 21 at an end of the spring member fits into an indentation 19. The spring member is formed of sufficient length so that it is placed under stress when it is in position within the recess, as shown in Figures 1, 2, and 3, and raised portions 23 of the spring member bear against the capacitor 14 to maintain it securely against wall 13 of the recess 8.

It will be seen from the foregoing that the arrangement described will preclude any serious vibration problem; also, the construction locks the capacitor in place while permitting easy removal thereof by simply pulling outwardly on bowed portion 24 of spring member 20 so as to cause the tangs 21 to be withdrawn from the indentations 19.

It will be clear that it is possible to vary the precise structure of the invention, as illustrated in the drawing, while retaining the applicant's inventive concept. For instance, while a specific construction has been set forth for the end of the spring member and its engagement in the indentation of the recess wall, it will be clear that this is susceptible of many modifications, and that the important feature which is to be covered is the engagement within an indentation in the recess wall of the end of a spring member, however, it may be achieved. Also, while a precise structure has been set forth for the remainder of the spring, including raised portions 23 and bowed portion 24, it will be understood that the inventive concept which is to be covered includes the securement of the capacitor by engagement with the spring member, and that the precise form of the elements may therefore depart from the exact structure shown.

For the above reasons, it will be apparent that while the invention has been explained by describing a particular embodiment thereof, improvements and modifications may be made without departing from the scope of the invention as defined in the appended claims.

What I claim as new and desire to secure by Letters Patent of the United States is:

1. In combination, supporting means for a dynamoelectric machine having internal walls forming a downwardly opening recess therein adapted to receive a capacitor, said walls having at least two indentations formed therein on substantially opposite sides of said recess, and a leaf spring member within said recess having at least a portion of each end arranged within an indentation whereby said spring member is adapted to bear against a capacitor within said recess so as to secure the capacitor firmly therein, said spring member having at least one bowed portion intermediate its ends whereby removal of the capacitor may be readily effected by pulling downwardly on said bowed portion to withdraw said end portions from said indentations.

2. In combination, a dynamoelectric machine shell including supporting means formed integrally therewith, said supporting means having internal walls forming a downwardly opening recess therein adapted to receive a capacitor, said walls having at least two indentations formed therein on substantially opposite sides of said recess, and a leaf spring member within said recess having at least a portion of each end arranged within an indentation, said spring member having a bowed center portion terminating at each end in a raised portion adapted to bear against a capacitor within said recess so as to secure the capacitor firmly therein whereby removal of the capacitor may be readily effected by pulling downwardly on said bowed center portion to withdraw said end portions from said indentations.

References Cited in the file of this patent
UNITED STATES PATENTS

| | | |
|---|---|---|
| 732,822 | Bradley | July 7, 1903 |
| 1,023,178 | Stevens | Apr. 16, 1912 |
| 1,866,107 | Hiering | July 5, 1932 |
| 2,048,896 | Spengler | July 28, 1936 |

FOREIGN PATENTS

| | | |
|---|---|---|
| 355,531 | Great Britain | Aug. 27, 1931 |